United States Patent Office 3,251,859
Patented May 17, 1966

---

3,251,859
PREPARATION OF POLYHALODIBENZO-p-DIOXINS
Marshall Kulka, Guelph, Ontario, Canada, assignor to United States Rubber Company, New York, N.Y., a corporation of New Jersey
No Drawing. Filed May 2, 1961, Ser. No. 107,015
9 Claims. (Cl. 260—340.3)

This invention relates to a process for preparing polyhalodibenzo-p-dioxins. More particularly, this invention relates to a new method for the preparation of octahalodibenzo-p-dioxins having the general formula:

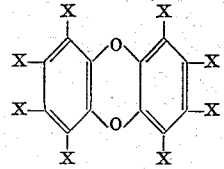

wherein X may be chlorine or bromine.

It has heretofore been known that, when the potassium or sodium salt of o-chlorophenol is heated in the presence of a catalytic amount of cupric salt, dibenzo-p-dioxin is formed. The reaction may be represented as follows:

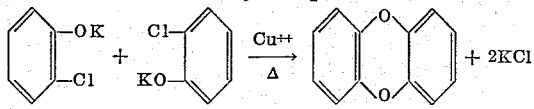

Using this method, 1,2,3,4,6,7,8,9-octachlorodibenzo-p-dioxin may be formed by heating the potassium or sodium salt of pentachlorophenol. The yield, about 35 percent of theoretical, is poor due to the interfering formation of polymer by reaction at the para position. This reaction may be illustrated thusly:

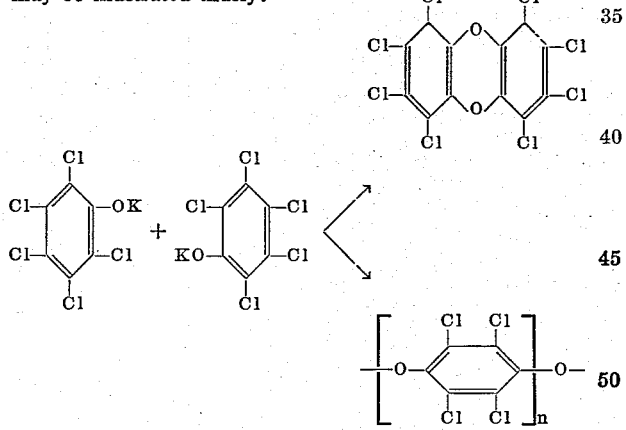

In accordance with this invention, 1,2,3,4,6,7,8,9-octahalodibenzo-p-dioxins are produced in high yields by reacting a pentahalophenol in the presence of a catalytic amount of a halogen or a halogenated cyclohexadienone at a temperature of between about 200° and 400° C. The reaction may be represented as follows:

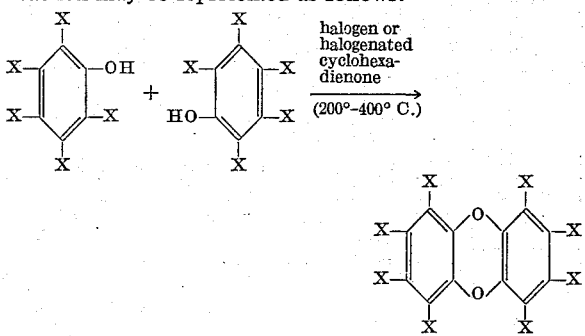

wherein X may be chlorine or bromine.

In order to effectively promote this reaction, a small amount of halogen or halogenated cyclohexadienone should be continually present in the reaction mixture. This may be accomplished by slowly bubbling chlorine or bromine gas into the reaction mixture or by the addition of a few iodine crystals to the pentahalophenol or a small amount of liquid bromine or halogenated cyclohexadienone at the beginning of the reaction. The most efficient halogen for promoting the above reaction has been found to be chlorine whereas iodine is the poorest.

Among the halogentated cyclohexadienones that are suitable for this invention are (A) 2,4,4,6-tetrachloro-2,5-cyclohexadienone, (B) 2,4,4,6-tetrabromo-2,5-cyclohexadienone, (C) 2,4,6-tribromo-4-chloro-2,5-cyclohexadienone, (D) 2,3,4,4,5,6 - hexabromo-2,5-cyclohexadienone, (E) 2,3,4,4,5,6 - hexachloro - 2,5-cyclohexadienone, and (F) 2,2,3,4,5,6-hexachloro-3,5-cyclohexadienone.

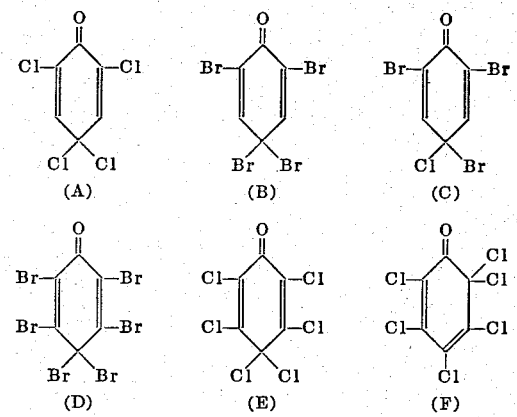

The compound (F) 2,2,3,4,5,6-hexachloro-3,5-cyclohexadienone is readily converted to (E) 2,3,4,4,5,6-hexachloro-2,5-cyclohexadienone when moderately heated so that it really functions in this invention as the latter compound. Similarly, (G) α - heptachloro-ketohydrobenzene may be utilized in accordance with this invention since it too is readily converted to (E) 2,3,4,4,5,6-hexachloro-2,5-cyclohexadienone when moderately heated.

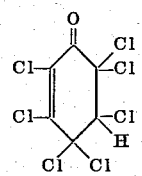

The brominated cyclohexadienones, illustrated by (B), (C) and (D), liberate bromine at a fairly low temperature, i.e., approximately 130° C. Under the temperature requirements of this invention, the bromine is quickly volatilized and lost. To insure completion of reaction, therefore, it is necessary to add small quantities of the brominated cyclohexadienones periodically. On the other hand, the chlorinated cyclohexadienones decompose at much higher temperatuers and at a slower rate so that their presence in the reaction mixture in small quantities will continually promote the reaction and insure its completion.

In the conversion of pentachlorophenol or pentabromophenol to the corresponding octachloro- or octabromodibenzo-p-dioxin in accordance with this invention, it is preferable though not essential to select, as the halogenated cyclohexadienone catalyst, (E) 2,3,4,4,5,6-hexachloro-2,5-cyclohexadienone or (F) 2,2,3,4,5,6-hexachloro-3,5-cyclohexadienone for the conversion reaction of pentachlorophenol, and (D) 2,3,4,4,5,6-hexabromo-2,5-cyclohexadienone for the conversion reaction of pentabromophenol. Not only do these particular catalysts promote the conversion of the indicated pentahalophenols, but the likelihood of contamination of the final product is diminished since any conversion of the catalyst itself would produce the identical dibenzo-p-dioxin.

The amount of halogen or halogenated cyclohexadienone required in this invention may range from about 0.1 percent to about 25 percent by weight of the reactant, and preferably from about 0.5 percent to about 5 percent. In carrying out the reaction, it is advantageous but not essential to employ an inert organic solvent. Preferred solvents are 1,2,4-trichlorobenzene and chlorinated naphthalene, although any inert organic solvent boiling over 200° C. is suitable.

The products of this invention are useful as chemical intermediates, biocides and flame retardants.

The invention is illustrated by the following examples.

*Example I*

A mixture of pentachlorophenol (40 g.) and 2,3,4,4,-5,6-hexachloro-2,5-cyclohexadienone (10 g.) was heated at 250° C. for 10 minutes and then at 300° C. for 15 minutes. Hydrogen chloride and chlorine were evolved. Crystallization of the cooled product from o-dichlorobenzene yielded 36 g. (83% of theoretical yield) of 1,2,3,4,6,7,8,9-octachlorodibenzo-p-dioxin in the form of white prisms melting at 330–331° C.

*Analysis.*—Calculated for $C_{12}Cl_8O_2$: carbon 31.30 percent, chlorine 61.75 percent. Found, carbon 31.73, 31.30 percent, chlorine 61.35 percent.

*Example II*

A solution of pentachlorophenol (40 g.) and 2,3,4,4,-5,6-hexachloro-2,5-cyclohexadienone (2 g.) in 1,2,4-trichlorobenzene (120 ml.) was heated under reflux (213° C.) for 16 hours. The reaction mixture was allowed to cool and the crystalline product was separated by filtration, washed with methanol, and dried. Thirty grams (86% of theoretical yield) of the product, 1,2,3,4,6,7,8,9-octachlorodibenzo-p-dioxin, melting at 330° C., were obtained.

When pentachlorophenol was heated in trichlorobenzene in the absence of hexachloro-cyclohexadienone, there was no reaction.

*Example III*

A mixture of pentabromophenol (35 g.) and 2,3,4,4,-5,6-hexachloro-2,5-cyclohexadienone (0.2 g.) was heated at 310°–320° C. for one-half hour and then at 360° C. for a few minutes. The cooled product on crystallization from 1,2,4-trichlorobenzene yielded 15 g. (52% of theoretical yield) of almost white plates of 1,2,3,4,6,7,8,9-octabromodibenzo-p-dioxin, M.P. 403–406° C.

*Analysis.*—Calculated for $C_{12}Br_8O_2$: bromine 78.43 percent. Found, bromine 78.95, 79.02 percent.

*Example IV*

A mixture of 2,3,5,6-tetrabromo-4-chlorophenol (30 g.) and 2,3,4,4,5,6-hexachloro-2,5-cyclohexadienone (0.2 g.) was heated at 300°–310° C. for 15 minutes and then at 350° C. for 15 minutes. The cooled product, on crystallization from 1,2,4-trichlorobenzene yielded 15 g. (62% of theoretical yield) of 1,2,4,6,7,9-hexabromo-3,8-dichlorodibenzo-p-dioxin, M.P. 386°–388° C.

*Example V*

The compound, 1,2,4,6,7,9-hexabromo-3,8-dichlorodibenzo-p-dioxin, was prepared from 2,3,5,6-tetrabromo-4-chlorophenol using 1,2,4-trichlorobenzene as solvent by the method described in Example II. The product melted at 385°–388° C.

*Example VI*

A solution of pentachlorophenol (25 g.) in 1,2,4-trichlorobenzene (75 ml.) was heated under reflux (213° C.) while chlorine gas was slowly bubbled into the reaction mixture for 6 hours. Then the solution was heated under reflux for another 10 hours and cooled, the white crystals filtered, washed with benzene and with methanol and dried. Eighteen grams (82% of theoretical yield) of the product, 1,2,3,4,6,7,8,9-octachlorodibenzo-p-dioxin, melting at 325–328° C., were obtained.

*Example VII*

A solution of pentachlorophenol (20 g.) in 1,2,4-trichlorobenzene (60 ml.) and 2 drops of liquid bromine was heated under reflux (213° C.) for 2 hours. Another drop of liquid bromine was then added and the refluxing continued for another 2 hours when another drop of liquid bromine was added. After refluxing for another 12 hours, the solution was cooled, the white crystals filtered, washed with benzene and with methanol and dried. Nine grams (52% of theoretical yield) of the product, 1,2,3,4,6,7,8,9-octachlorodibenzo-p-dioxin, melting at 326–328° C., were obtained.

*Example VIII*

A solution of pentachlorophenol (25 g.) in 1,2,4-trichlorobenzene (75 ml.) and iodine (0.2 g.) was heated under reflux (213° C.) for 16 hours. Iodine vapors were visible in the reaction flask throughout the whole reaction time. The solution was cooled, the white crystals filtered, washed with benzene and with methanol and dried. Five grams of 1,2,3,4,6,7,8,9-octachlorodibenzo-p-dioxin, melting at 326–328° C., were obtained.

Having thus described my invention, what I claim and desire to protect by Letters Patent is:

1. A method for the preparation of octahalo-dibenzo-p-dioxin wherein the halogen substituents are selected from the group consisting of chlorine and bromine, which method comprises introducing a halogen into a reaction mass comprising pentahalophenol, said halogen being introduced in the proportion from about 0.1% to about 25% based on the weight of said pentahalophenol, heating the reaction mass to a temperature of 200° C. to 400° C., and recovering said octahalodibenzo-p-dioxin.

2. The process of claim 1 wherein said pentahalophenol is dissolved in an inert organic solvent medium.

3. The process of claim 2 wherein said inert solvent medium comprises 1,2,4-trichlorobenzene.

4. The process of claim 1 wherein said halogen being introduced to said reaction mass is chlorine.

5. The process of claim 1 wherein said halogen being introduced to said reaction mass is bromine.

6. The process of claim 1 wherein said halogen being introduced to said reaction mass is iodine.

7. The process for preparing octachlorodibenzo-p-dioxin comprising heating 100 parts of pentachlorophenol to a temperature of from 200 C. to 400 C., introducing from 0.1 to 25 parts of chlorine thereto, and subsequently recovering octachlorodibenzo-p-dioxin.

8. The process for preparing octachloro-dibenzo-p-dioxin comprising heating 100 parts of pentachlorophenol to 200° C. to 400° C., introducing from 0.1 to 25 parts of bromine, and subsequently recovering said octachlorodibenzo-p-dioxin.

9. The process of making octachlorodibenzo-p-dioxin comprising heating a mixture of 100 parts of pentachlorophenol and 0.1 to 25 parts of iodine to a temperature of 200° C. to 400° C., and subsequently recovering said octachlorodibenzo-p-dioxin.

No references cited.

HENRY R. JILES, *Acting Primary Examiner.*

IRVING MARCUS, DUVAL T. McCUTCHER,
*Examiners.*

JOSE TOVAR, *Assistant Examiner.*